United States Patent
Fu et al.

(10) Patent No.: US 9,148,039 B2
(45) Date of Patent: Sep. 29, 2015

(54) MOTOR ASSEMBLY

(75) Inventors: Zhi Ping Fu, Shenzhen (CN); Po Lun Cheng, Hong Kong (CN); Min Li, Shenzhen (CN)

(73) Assignee: JOHNSON ELECTRIC S.A, Murten (CH)

(*) Notice: Subject to any disclaimer, the term of this patent is extended or adjusted under 35 U.S.C. 154(b) by 708 days.

(21) Appl. No.: 13/292,419

(22) Filed: Nov. 9, 2011

(65) Prior Publication Data

US 2012/0112567 A1   May 10, 2012

(30) Foreign Application Priority Data

Nov. 10, 2010 (CN) .......................... 2010 1 0539038

(51) Int. Cl.
*H02K 7/10* (2006.01)
*H02K 7/118* (2006.01)

(52) U.S. Cl.
CPC ..................................... *H02K 7/118* (2013.01)

(58) Field of Classification Search
CPC ................................ F04B 9/06; F04B 49/121
USPC .......................... 310/76, 78, 84, 92, 100, 273
See application file for complete search history.

(56) References Cited

U.S. PATENT DOCUMENTS

| | | | | |
|---|---|---|---|---|
| 2,502,790 | A | * | 4/1950 | Jencick ........................... 464/73 |
| 4,247,265 | A | | 1/1981 | Cavalcante |
| 4,661,085 | A | * | 4/1987 | Carli .............................. 464/160 |
| 4,861,240 | A | * | 8/1989 | Marioni et al. ............ 417/423.3 |
| 5,668,425 | A | | 9/1997 | Marioni et al. |
| 6,007,308 | A | | 12/1999 | Ko |
| 6,661,144 | B1 | * | 12/2003 | Diener et al. ................. 310/105 |
| 6,972,502 | B2 | * | 12/2005 | Marioni ..................... 310/75 R |
| 7,097,434 | B2 | * | 8/2006 | Marioni ..................... 417/423.1 |
| RE39,481 | E | * | 1/2007 | Marioni ...................... 310/12.18 |
| 7,972,121 | B2 | | 7/2011 | Zhang et al. |
| 2002/0122731 | A1 | * | 9/2002 | Marioni ........................ 417/352 |

FOREIGN PATENT DOCUMENTS

WO   WO-9421026   9/1994

* cited by examiner

*Primary Examiner* — Naishadh Desai
(74) *Attorney, Agent, or Firm* — Muncy, Geissler, Olds & Lowe, P.C.

(57) ABSTRACT

A motor assembly includes a working part, a synchronous motor having a shaft, and a mechanical coupling joining the working part to the motor. The coupling has two driving teeth fixed relative to the shaft, two driven teeth fixed relative to the working part, and two middle members. The coupling provides a predetermined range of angular movement between the motor and the working part. The middle members are circumferentially distributed between the two driving teeth and between the two driven teeth, thereby each of the middle members is movable by the driving teeth to contact the driven teeth and provides an interference between a driving tooth and a driven tooth to drive the working part.

14 Claims, 2 Drawing Sheets

MOTOR ASSEMBLY

CROSS REFERENCE TO RELATED APPLICATIONS

This non-provisional patent application claims priority under 35 U.S.C. §119(a) from Patent Application No. 201010539038.8 filed in The People's Republic of China on Nov. 10, 2010.

FIELD OF THE INVENTION

This invention relates to a motor assembly and in particular, to a single phase synchronous motor assembly having a mechanical coupling connecting the rotor of the synchronous motor with a working part.

BACKGROUND OF THE INVENTION

Small electric pumps, for example as used for circulating water in fish tanks and for draining water from washing machines, are well known. Such pumps are usually driven by sub-fractional horsepower single phase synchronous motors which have a long life and a simple construction allowing the stator to be fully sealed from the pump chamber and from the rotor of the motor.

Being a single phase synchronous motor, the motor can start in either direction and thus, the impeller of the pump is designed to operate in both directions. However, the starting torque is relatively low and the motor has difficulty starting under a full load. To overcome this problem, it is known to allow a limited range of free rotation between the rotor and impeller, usually up to about 360 degrees. This allows the motor to initially oscillate until it gains sufficient initial momentum before driving the impeller and its load. This is achieved by using a mechanical coupling, commonly referred to as a lost motion clutch, in which two spigots or teeth are arranged to interact. However, as the coupling allows free movement of slightly less than 360 degrees there is considerable noise and strain as the spigots crash together.

U.S. Pat. No. 4,861,240, sought to overcome this problem by having the spigots rotate within a sealed chamber containing a viscous fluid, e.g., an oil or grease, to absorb the knocking noise. As the volume of viscous fluid is relatively large and the pressure on the viscous fluid is also relatively large, this placed a great strain on the seal and introduced a possible source of contamination should the seal of the chamber fail during use, allowing the viscous fluid to mix with the fluid being pumped.

Thus, there is a desire for an improved coupling between a rotor of a synchronous motor and a working part such as an impeller of a pump.

SUMMARY OF THE INVENTION

Accordingly, in one aspect thereof, the present invention provides a motor assembly comprising: a synchronous motor having a shaft; a working part with a hollow body; and a mechanical coupling comprising a driving member having at least one driving tooth, at least one driven tooth and at least one middle member; wherein the at least one driving tooth projects outwardly from a cylindrical hub of the driving member fixed relative to the shaft; the at least one driven tooth projects inwardly from the hollow body and is radially spaced from the at least one driving tooth; and the at least one middle member is disposed between the cylindrical hub and the hollow body and to arranged to allow up to a predetermined range of relative angular motion between the driving member and the working part before causing an interference between the at least one driving tooth and the at least one driven tooth whereby the driving member is able to drive the working part.

Preferably, the at least one middle member is made of elastic material.

Preferably, there are two driving teeth, diametrically opposed to each other and each projecting from the cylindrical hub, there are two driven teeth, diametrically opposed to each other and each projecting from a hollow body of the working part, and there are two middle members each arranged between the cylindrical hub and the hollow body in a radial direction of the shaft and respectively disposed between the two driving teeth and respectively disposed between the two driven teeth.

Preferably, the radial width of each middle member is less than the radial distance between the cylindrical hub and the hollow body.

Preferably, the two middle members are arcuate in shape.

Preferably, the at least one middle member is configured to make an initial line contact with its corresponding driving tooth.

Preferably, a surface of the at least one middle member and an opposing surface of its corresponding driving tooth form an angle of between 10 to 80 degrees when the middle member is in line contact with said corresponding driving tooth.

Preferably, the at least one middle member is configured to make planar contact with its corresponding driven tooth.

Preferably, the cylindrical hub is connected to the shaft by a sleeve, and the sleeve and the cylindrical hub are made of plastic material.

Preferably, the driving member is captured within the hollow body of the working part by a disc, the disc being sealed to the hollow body and to the shaft by O-rings and axial play between the driving member and the working part is reduced by a spring disposed between two washers disposed about the shaft and between the disc and the driving member and each driving tooth has a ridge formed on a surface facing an end wall of the hollow body and the spring resiliently urging the ridge into contact with the end wall.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
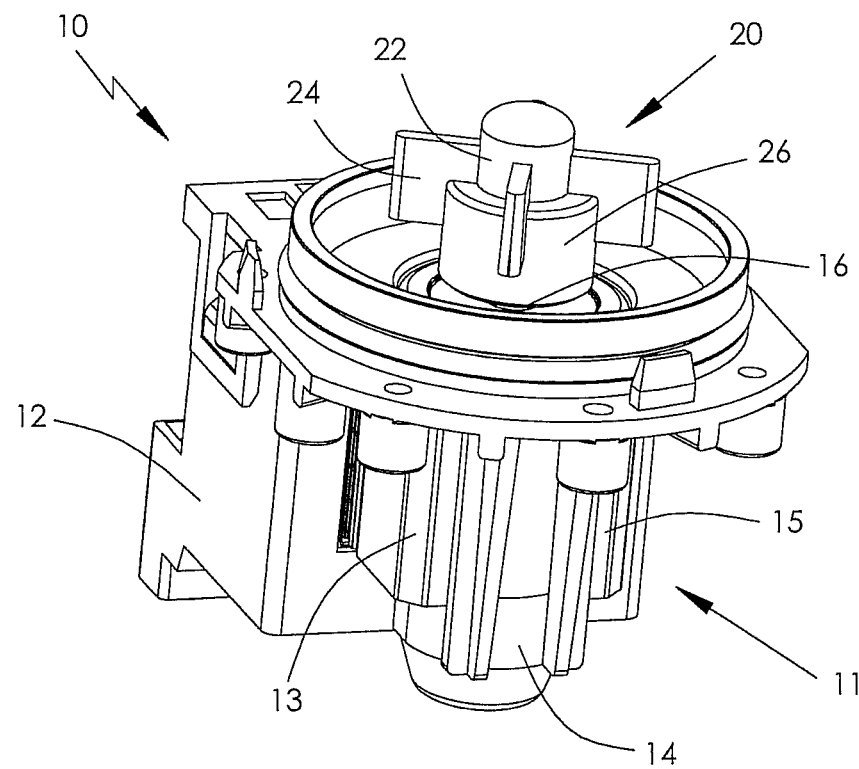
FIG. 1 shows a motor assembly in accordance with the preferred embodiment of the present invention.

As shown in the drawings, a motor assembly 10 in accordance with a preferred embodiment of the present invention includes a single phase synchronous motor 11 having a shaft 16, a working part 20 and a mechanical coupling connecting working part 20 to the shaft 16. The mechanical coupling is of the lost motion clutch type, meaning that the coupling allows a certain maximum angular movement in either direction before the driving part drives the driven part.

The synchronous motor 11 includes a stator 12 with an electromagnet and a rotor with permanent magnets. The electromagnet comprises a coil wound about a stator core forming two stator poles 13 and 15. The rotor is received in a rotor housing 14 between two stator poles. The rotor housing 14 is preferably made of plastic. In this embodiment, the working part 20 is an impeller of a small pump, which has a hollow central hub 22, a plurality of blades 24 outwardly extending from the central hub 22, and a hollow body 26 extending downwardly from the central hub 22. The hollow body 26 forms an annular ring which is concentric with the shaft 16. It should be understood that the working part 20 may be another kind of load which is suitable to be driven by a synchronous motor.

The mechanical coupling includes a driving member 30, two driven teeth 40, and two middle members 50.

The driving member 30 is monolithic and includes a cylindrical hub 32 fixed to the shaft 16 so as to rotate with the shaft 16, a base portion 34 outwardly extending from the lower end of the cylindrical hub 32, and two driving teeth 36 projecting radially from the outer surface of the cylindrical hub 32. The two driven teeth 40 project radially inwardly from the inner surface of the hollow body 26. Preferably, the two driving teeth 36 are diametrically opposite to each other and the two driven teeth 40 are diametrically opposite to each other. The driven teeth are radially spaced from the driving teeth such that with the middle members removed, the driving member would freely rotate within the driven member. That is, the driving teeth and the driven teeth are axially aligned but radially spaced with the driving teeth driving the driven teeth through the middle members.

Figure 2:
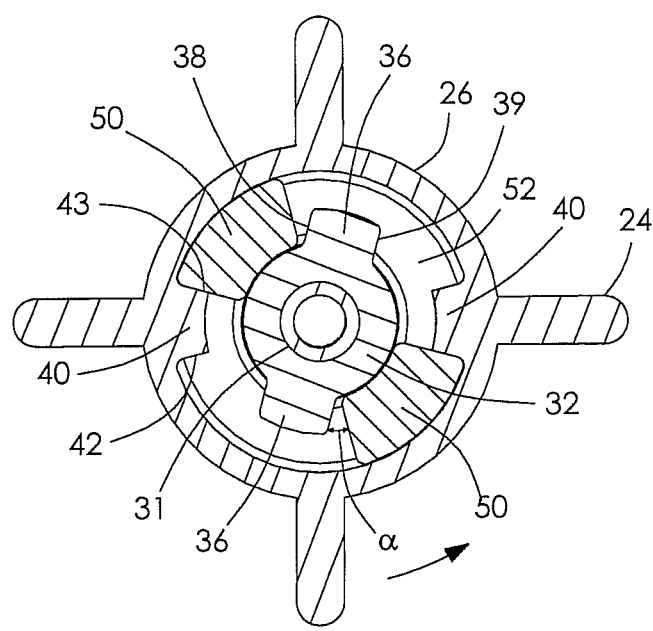
FIG. 2 is partial view of a mechanical coupling, being a part of the motor assembly of FIG. 1.
Figure 3:
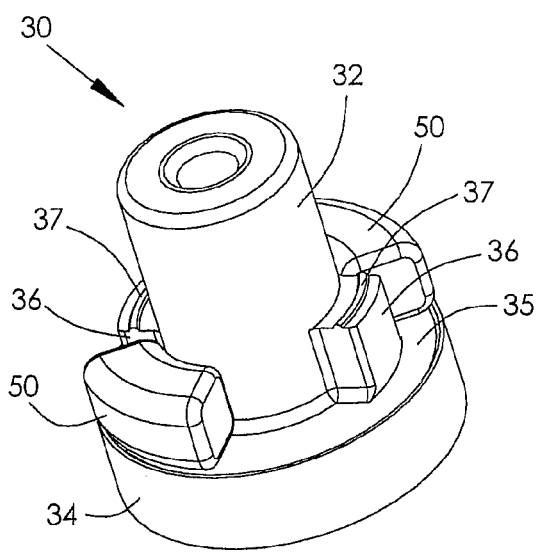
FIG. 3 shows a driving member and middle members being parts of the coupling of FIG. 2.
Figure 4:
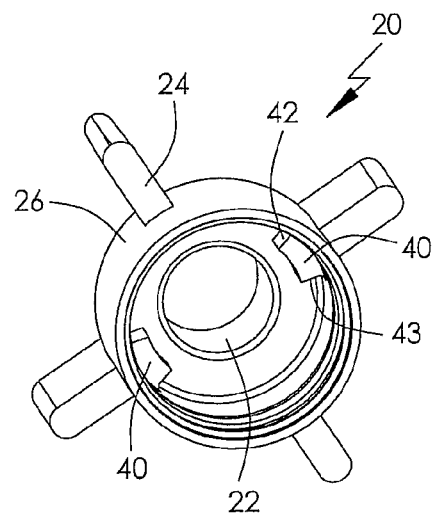
FIG. 4 shows an impeller forming a part of the coupling of FIG. 2.

In this embodiment, in the rotational direction of the rotor, each of the driving teeth 36 and the driven teeth 40 has two end surfaces which are respectively defined as a front end surface and a rear end surface. For example, if, as shown in FIG. 2, the direction of rotation of the rotor is counter-clockwise, as indicated by the arrow, then the first end surface 38 of each driving tooth 36 is a front end surface, the second end surface 39 of each driving tooth 36 is a rear end surface, the first end surface 42 of each driven tooth 40 is a front end surface, and the second end surface 43 of each driven tooth 40 is a rear end surface.

The two middle members 50 are separate and circumferentially spaced so as to be able to move freely relative to each other. The base portion 34 is received in the hollow body 26. The cylindrical hub 32 is received in the hollow body 26 and the central hub 22. The volume bounded by the upper surface 35 of the base portion 34, the cylindrical hub 32, the inner cylindrical wall of the hollow body 26 and an end wall 23 of the hollow body forms a cavity 52 in which the driving teeth, driven teeth and middle members are located. Each middle member 50 is supported on the upper surface 35 of the base portion 34 thereby being limited between the outer surface of the cylindrical hub 32 and the inner surface of the hollow body 26 in the radial direction of the shaft 16, and limited between the base portion 34 and the end wall 23 of the hollow body in the axial direction. The radial width of each middle member 50 is less than the radial distance between the outer surface of the cylindrical hub 32 and the inner surface of the hollow body 26 so that the middle member 50 is arranged between the cylindrical hub 32 and the hollow body 26 even when the middle member 50 is immersed in hot water, which causes the middle member 50 to expand. Thus, the situation that the middle member 50 is jammed between the cylindrical hub 32 and the hollow body 26 can be avoided.

The two middle members 50 are alternately distributed with the two driving teeth 36 and the two driven teeth 40 in the circumferential direction of the shaft 16. That is, each middle member 50 is arranged between and able to be in contact with the front end surface 38 of its corresponding driving tooth 36 and the rear end surface 43 of its corresponding driven tooth 40 so that the mechanical coupling can rotate the working part 20 once the rotor starts rotating. By this configuration, the motor assembly can have a better dynamic balance. Each middle member 50 is respectively arranged between the two driving teeth 36 and between the two driven teeth 40, thus the rotor is able to freely oscillate through a certain angular distance during the starting phase.

Preferably, the middle members 50 are made of an elastic material such as rubber and are arcuate in shape so as to slide along the inner surface of the hollow body 26. Each middle member 50 may be configured to be in planar contact with the rear end surface 43 of its corresponding driven tooth 40 so as to prevent the middle member 50 from sliding into the gap between the inner surface of the driven tooth 40 and the outer surface of the cylindrical hub 32. On the other hand, each middle member 50 may be configured to be in line contact with the front end surface 38 of its corresponding driving tooth 36. When the middle member 50 is in line contact with its corresponding driving tooth 36, two opposing surfaces of the middle member 50 and its corresponding driving tooth 36 may form an angle $\alpha$ of between 10 to 80 degrees, preferably between 30 to 60 degrees. Thus, the cylindrical hub 32 helps to absorb the shear force applied to the middle member 50 when the middle member 50 is pressed by the driving tooth 36 against the driven tooth 40, avoiding breaking the middle member 50. Also, by the initial line contact occurring at the root of the driving teeth, the middle member is more effectively pressed against the driven tooth by the slightly outwardly resultant force applied to the middle member help to keep the middle member engaged or pressed against the circumferential wall of the hollow body 26. By the above configurations, the mechanical coupling can achieve a higher reliability and a longer life.

Although the cylindrical hub 32 of the driving member 30 may be pressed directly on to the shaft 16, the driving member preferably has a further sleeve 31 disposed between the cylindrical member 32 and the shaft 16. The shaft 16 has a plurality of axially extending knurls 17. When the sleeve 31 is pressed on to the shaft the knurls bite into the sleeve to rigidly fix the sleeve to the shaft. The cylindrical hub 32 is pressed onto the sleeve 31 with a high friction or tight fit so as to rotate with the sleeve 31 and shaft 16. However, this additional part, sleeve 31, allows the driving member to slip on the shaft should the impact on the driving member be greater than a preset value, thereby preventing the impact force from causing twisting of the driving member on the shaft over the knurls which would quickly destroy the connection between the driving member and the shaft. This arrangement allows the use of a plastic driving member compared with typically brass driving members of the prior art due to the greater holding forces which can be achieved with brass on the shaft.

Figure 5:
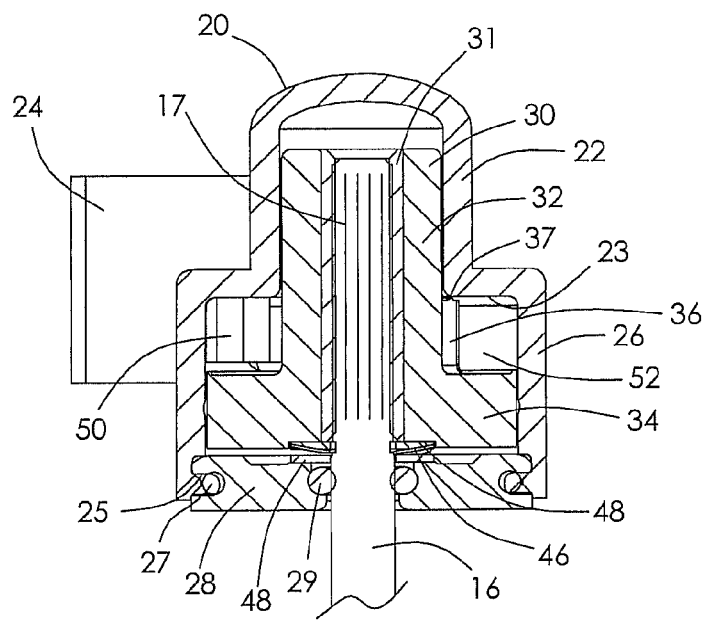
FIG. 5 is a sectional view of the coupling of FIG. 2.

As shown in FIG. 5, the driving member 30 is held captive within the hollow body of the driven member 20 by a disc 28. The shaft 16 passes through the disc and the radially outer edge of the disc has a groove which mates with a ridge 25 formed on the inner circumferential surface of the hollow body 26. Optionally, to seal the cavity 52 in order to prevent contamination and loss of lubricant, if used, an O-ring 27 may be disposed in the groove to seal the disc to the hollow body 26 and a further O-ring 29 used to seal the disc to the shaft 16.

Optionally, to limit axial movement between the working part 20 (such as a pump impeller) and the driving member 30, a spring 46, such as a disc spring, may be used to reduce axial play. The spring is disposed between two washers 48, one in contact with the disc 28 and the other in contact with the driving member 30. the spring and washers are disposed about the shaft and press the driving member into axial contact with the working part. In particular, the driving teeth 36, each have a ridge 37 on their upper surface which makes contact with the end wall 23 of the hollow body. The ridges 37 significantly reduce the contact surface area between the driving member and the end wall compared to full contact between the driving teeth and the end wall. Alternatively, the cylindrical hub may contact the upper end of the central hub, but this is less preferred.

It should be understood that the mechanical coupling may have more than two driving teeth, more than two driven teeth, and more than two middle members which are alternately distributed between the driving teeth and between the driven teeth in the circumferential direction of the shaft. In another case, the mechanical coupling may have a single driving tooth, a single driven tooth, and a single middle member or two middle members disposed on respective sides of the driving tooth in the circumferential direction.

The motor assembly in accordance with the embodiment of the present invention is particularly suitable for a centrifugal pump, such as a drain pump for a dishwasher.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor assembly comprising:
a synchronous motor having a shaft;
a working part with a hollow body;
a driving member having at least one driving tooth;
at least one driven tooth; and
at least one middle member;
wherein the at least one driving tooth projects outwardly from a cylindrical hub of the driving member fixed relative to the shaft;
the at least one driven tooth projects inwardly from the hollow body, the distance between an axis of the shaft and all points on an inner surface of the driven tooth is greater than the distance between the axis of the shaft and all points on an outer surface of the driving tooth so that the at least driven tooth is radially spaced from the at least one driving tooth; and
the at least one middle member is disposed between the cylindrical hub and the hollow body and arranged to allow up to a predetermined range of relative angular motion between the driving member and the working part before causing an interference between the at least one driving tooth and the at least one driven tooth whereby the driving member is able to drive the working part.

2. The motor assembly of claim 1, wherein the at least one middle member is made of elastic material.

3. The motor assembly of claim 1, wherein there are two driving teeth, diametrically opposed to each other and each projecting from the cylindrical hub, there are two driven teeth, diametrically opposed to each other and each projecting from a hollow body of the working part, and there are two middle members each arranged between the cylindrical hub and the hollow body in a radial direction of the shaft and respectively disposed between the two driving teeth and respectively disposed between the two driven teeth.

4. The motor assembly of claim 3, wherein the radial width of each middle member is less than the radial distance between the cylindrical hub and the hollow body.

5. The motor assembly of claim 3, wherein the two middle members are arcuate in shape.

6. The motor assembly of claim 1, wherein the at least one middle member is configured to make an initial line contact with its corresponding driving tooth.

7. A motor assembly comprising:
a synchronous motor having a shaft;
a working part with a hollow body;
a driving member having at least one driving tooth;
at least one driven tooth; and
at least one middle member;
wherein the at least one driving tooth projects outwardly from a cylindrical hub of the driving member fixed relative to the shaft;
the at least one driven tooth projects inwardly from the hollow body and is radially spaced from the at least one driving tooth; and
the at least one middle member is disposed between the cylindrical hub and the hollow body and arranged to allow up to a predetermined range of relative angular motion between the driving member and the working part before causing an interference between the at least one driving tooth and the at least one driven tooth whereby the driving member is able to drive the working part;
wherein a surface of the at least one middle member and an opposing surface of its corresponding driving tooth form an angle $\alpha$ of between 10 to 80 degrees when the middle member is in line contact with said corresponding driving tooth.

8. The motor assembly of claim 7, wherein the angle $\alpha$ is between 30 to 60 degrees.

9. The motor assembly of claim 1, wherein the at least one middle member is configured to make planar contact with its corresponding driven tooth.

10. The motor assembly of claim 1, wherein the cylindrical hub is connected to the shaft by a sleeve disposed between the cylindrical hub and the shaft, and the sleeve and the cylindrical hub are made of plastic material.

11. A motor assembly comprising:
a synchronous motor having a shaft;
a working part with a hollow body;
a driving member having at least one driving tooth;
at least one driven tooth; and
at least one middle member;
wherein the at least one driving tooth projects outwardly from a cylindrical hub of the driving member fixed relative to the shaft;
the at least one driven tooth projects inwardly from the hollow body and is radially spaced from the at least one driving tooth; and
the at least one middle member is disposed between the cylindrical hub and the hollow body and arranged to allow up to a predetermined range of relative angular motion between the driving member and the working part before causing an interference between the at least one driving tooth and the at least one driven tooth whereby the driving member is able to drive the working part;

wherein the driving member is captured within the hollow body of the working part by a disc, the disc being sealed to the hollow body and to the shaft by O-rings and axial play between the driving member and the working part is reduced by a spring disposed between two washers disposed about the shaft and between the disc and the driving member and each driving tooth has a ridge formed on a surface facing an end wall of the hollow body and the spring resiliently urging the ridge into contact with the end wall.

12. A motor assembly comprising:
a synchronous motor having a shaft;
a working part with a hollow body;
a driving member having at least one driving tooth;
at least one driven tooth; and
at least one middle member;
wherein the at least one driving tooth projects outwardly from a cylindrical hub of the driving member fixed relative to the shaft;
the at least one driven tooth projects inwardly from the hollow body, the distance between an axis of the shaft and any point on an inner surface of the driven tooth is greater than the distance between the axis of the shaft and any point on an outer surface of the driving tooth so that the at least driven tooth is radially spaced from the at least one driving tooth; and
the at least one middle member is disposed between the cylindrical hub and the hollow body and arranged to allow up to a predetermined range of relative angular motion between the driving member and the working part before causing an interference between the at least one driving tooth and the at least one driven tooth whereby the driving member is able to drive the working part, wherein there are two driving teeth, diametrically opposed to each other and each projecting from the cylindrical hub, there are two driven teeth, diametrically opposed to each other and each projecting from a hollow body of the working part, and there are two middle members each arranged between the cylindrical hub and the hollow body in a radial direction of the shaft and respectively disposed between the two driving teeth and respectively disposed between the two driven teeth, and wherein the driving member is captured within the hollow body of the working part by a disc, the disc being sealed to the hollow body and to the shaft by O-rings and axial play between the driving member and the working part is reduced by a spring disposed between two washers disposed about the shaft and between the disc and the driving member and each driving tooth has a ridge formed on a surface facing an end wall of the hollow body and the spring resiliently urging the ridge into contact with the end wall.

13. The motor assembly of claim 12, wherein the cylindrical hub is connected to the shaft by a sleeve, and the sleeve and the cylindrical hub are made of plastic material.

14. The motor assembly of claim 3, wherein the two middle members are separate and circumferentially spaced so as to be able to move freely relatively to each other.

* * * * *